Jan. 25, 1927.
F. M. PFEIFER ET AL
1,615,722
TIRE CARRIER CLAMP
Filed July 2, 1926    2 Sheets-Sheet 1
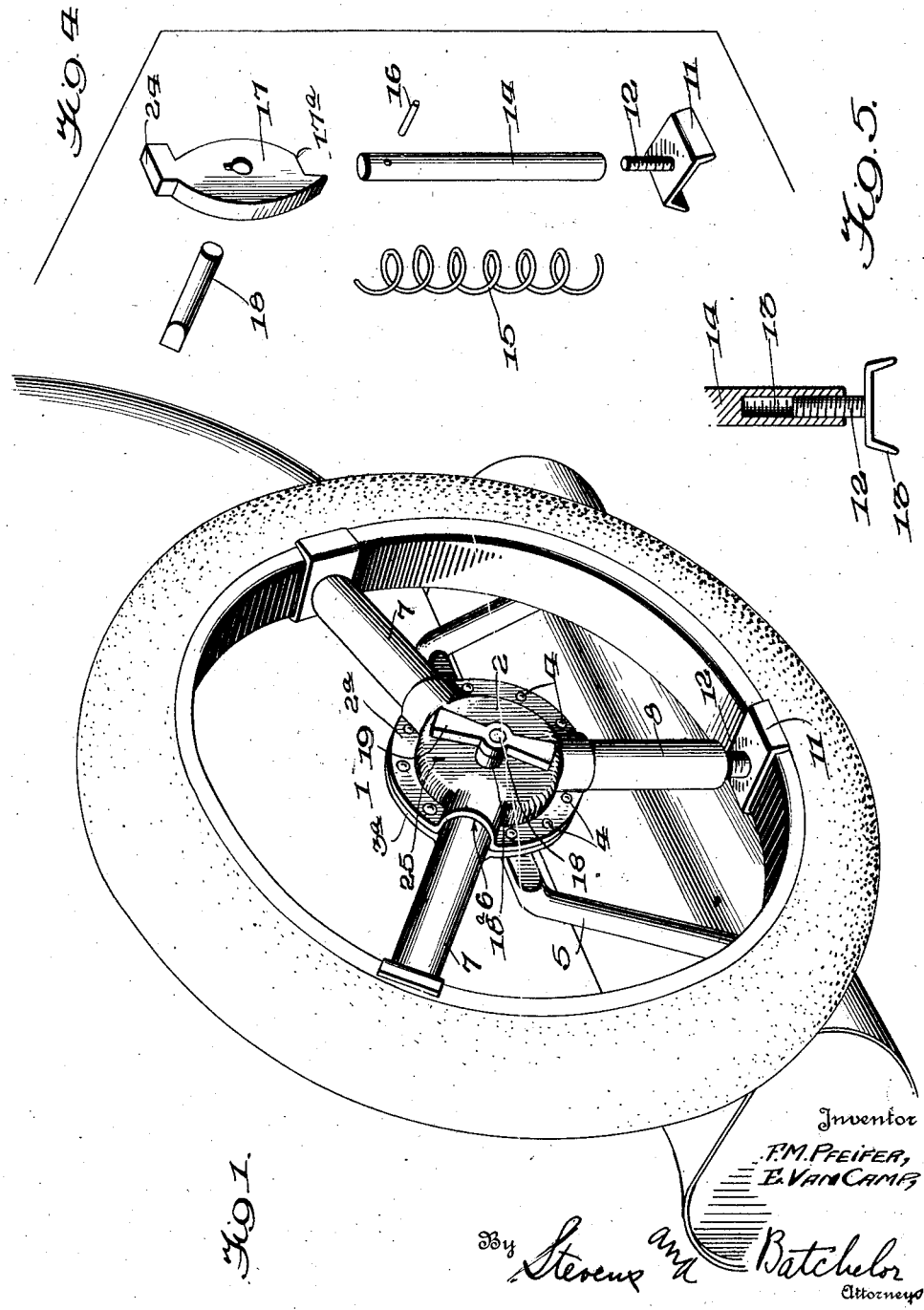
Inventor
F. M. PFEIFER,
E. VAN CAMP
By Stevens and Batchelor
Attorneys Jan. 25, 1927.
F. M. PFEIFER ET AL
1,615,722
TIRE CARRIER CLAMP
Filed July 2, 1926
2 Sheets-Sheet 2
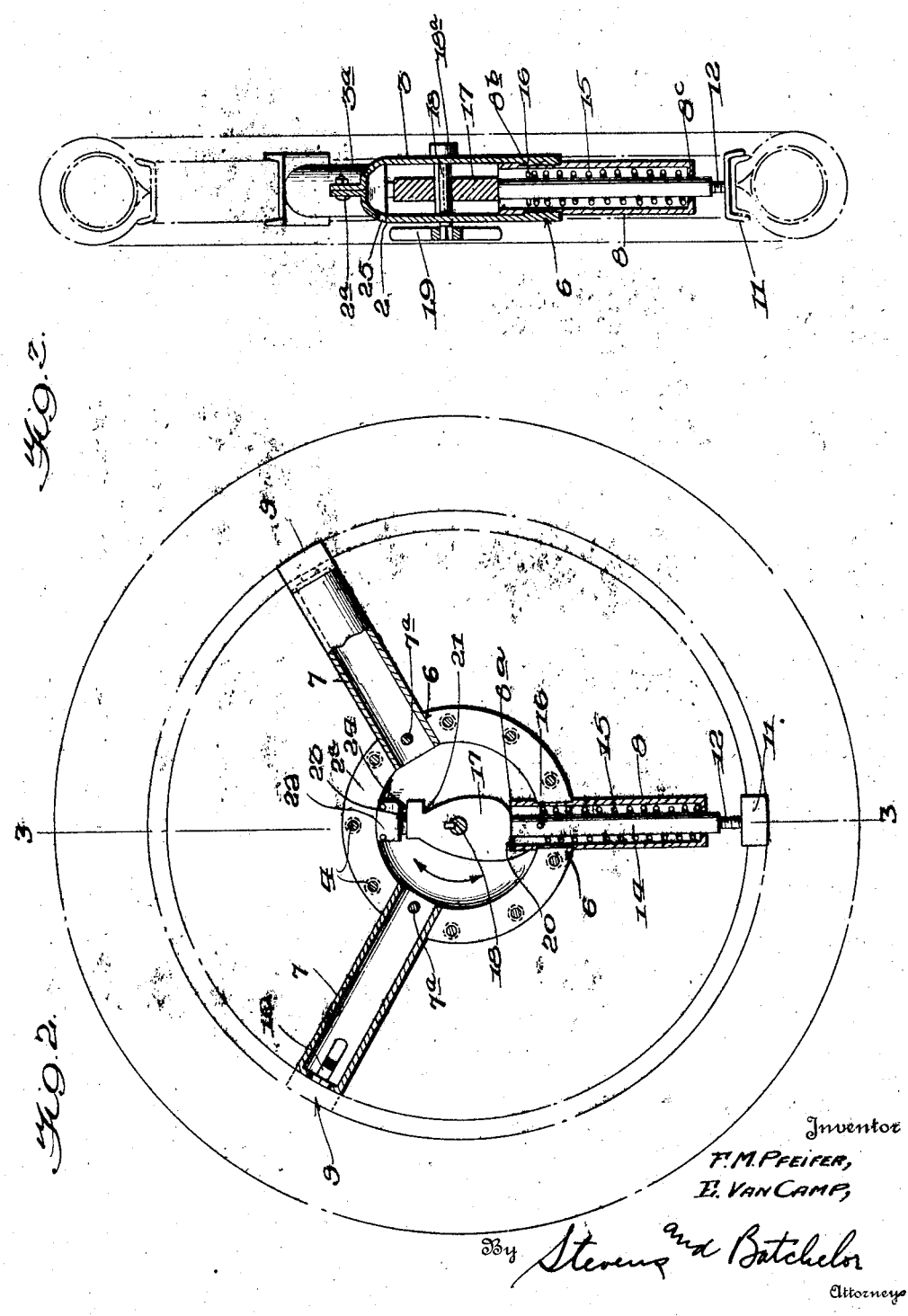

Patented Jan. 25, 1927.

1,615,722

UNITED STATES PATENT OFFICE.

FRANK M. PFEIFER AND EDWARD VAN CAMP, OF QUINCY, ILLINOIS.

TIRE-CARRIER CLAMP.

Application filed July 2, 1926. Serial No. 120,185.

Our invention relates to certain new and useful improvements in spare tire carriers for motor vehicles and has for its principal object to provide a greatly simplified device of this kind which can be adjusted to hold tires of different sizes.

The invention also comprehends a novel extensible arm for engaging the tire and operating means therefor.

A still further object of the invention is to provide in connection with the device a protective closure for the tire valve stem.

The foregoing and other objects are attained by means of a novel combination and arrangement of parts to be hereinafter described and claimed, and in order that the invention may be better understood, reference is had to the accompanying drawings forming a part of this specification. The drawings illustrate what we now regard as a preferred embodiment of the invention, but it is to be understood, of course, that it is in no wise limitative and that we are entitled to make such changes and modifications as fairly fall within the spirit and scope of the invention as claimed hereinafter.

In the drawings,

Figure 1 is a perspective view illustrating a tire carrier incorporating our invention and showing a tire in place thereon;

Fig. 2 is a vertical sectional view with certain parts shown in elevation;

Fig. 3 is a section on the line 3—3 of Fig. 2;

Fig. 4 is a group perspective view illustrating certain of the operating mechanism disassembled; and Fig. 5 is a detail sectional view of the extensible arm and its adjustable rim engaging saddle.

Referring specifically to the drawings, wherein like reference characters designate similar parts in all views, numeral 1 denotes the housing which is formed by recessed duplicate sections 2 and 3. These are preferably metal stampings, and are provided with circumferential flanges $2^a$ and $3^a$, respectively, as clearly shown in the drawings. The sections 2 and 3 are fastened together by rivets 4 passing through the flanges $2^a$ and $3^a$.

In Figure 1 the housing 1 is shown applied to a tire carrier bracket 5. Bolts, or any other conventional fastening means may be availed of, the precise nature of which is immaterial to the present invention.

The housing 1 carries three radially projecting arms which are secured in sockets 6 defined by diametrically opposite semi-circular depression in flanges $2^a$ and $3^a$ which depressions are, of course, formed by the same punch of the die which produces the sections of the housing.

In two of the sockets 6 are fixedly secured duplicate rim supporting members 7 of tubular form and having secured across their ends U-shaped rim engaging seats 9. The seats 9 are fastened to the ends of the members 7 in any preferred manner and are provided with holes communicating with interior of said members, and through which the tire valve stem 10 may be inserted when the rim and tire are placed upon the carrier. It will be obvious that by this arrangement the valve stem and the valve therein will be protected against dirt and injury. We have shown the duplicate radial members 7 as fastened in their sockets 6 by means of rivets $7^a$. Of course, other means could be availed of without a departure from the invention.

The third rim supporting member comprises a tubular member 8 which is substantially the same as duplicate members 7 except that it is secured in its socket 6 so that its inner end will project a substantial distance beyond the inner edge of the flanges $2^a$, $3^a$ and into the interior housing 1 as indicated at $8^a$ in Figure 2. Also the member 8 is shown as being provided with a circumferential groove $8^b$ adjacent its end $8^a$ the said groove defining shoulders to be engaged by the front and rear edges of the socket 6. By this construction, the member 8 will be held clamped in a fixed position against axial movement.

Instead of a fixed rim engaging saddle or seat, the member 8 carries its U-shaped saddle 11 on a screw stem 12 threadedly received in a socket 13 of a rod 14 slidingly carried in the said tubular member 8. A spring 15 bearing against the outer end flange $8^c$ of member 8 and engaging a cross pin 16 of the rod 14 serves to normally hold the inner end of said rod in bearing contact with a cam 17 within the housing 1. The cam 17 is keyed to a stub shaft 18 journalled in central bearings $18^a$ formed in the sections 2 and 3.

One end of the shaft 18 protrudes from the front of the casing 1 and is squared or otherwise formed to receive a handle 19 which is clearly shown in Figure 1. It is obvious that rotation of handle 19 in a counter clockwise direction as viewed in Figures 1 and 2, will cause the cam 17 to move in a direction to project the rod 14 to the rim engaging position which is shown in Figure 2. Likewise it is apparent that upon rotation of the handle to move the cam 17 in a clockwise direction, as viewed in Figure 2, the spring 15 will be permitted to force the rod 14 into the housing to disengage the saddle 11 from the rim so that the tire may be removed from the rack.

Particular attention is invited to the peculiar shape of cam 17 and to the advantages derived thereby. Figures 2 and 4 clearly show that the final active surface, or highest point of the cam, is substantially flat as indicated at 17$^a$. It is also noted that a shoulder 20 formed at the remote end of this flat surface 17$^a$ serves to limit the counter clockwise rotation of the cam as clearly shown in Figure 2,—this shoulder engaging the inwardly projecting end 8$^a$ of the tubular member 8. The relative arrangement of the shoulder 20, with respect to the projecting tube end 8$^a$, is such that the end of the rod 14 will flatly engage the surface 17$^a$ of the cam at, what might be properly termed, its "dead center". Thus, the cam 17 will remain in the position shown in Figure 2 and the rod 14 will not be permitted to spring inwardly. Attention is also called to the shoulder 21 of the cam which is formed at the other end of its active surface. This last mentioned shoulder 21 is designed to engage the end of rod 14 to limit clockwise rotation of the cam as viewed in Figure 2. Due to shoulders 20 and 21, it is impossible to rotate the cam more than 180 degrees, and what is more important, it is impossible to rotate it so as to disengage the active surface of the cam from the pin or rod 14. Were it possible to rotate the cam so that the end of rod 14 would be disengaged from the active surface, the back of the shoulder or projection 20 would be presented against the inwardly projecting end 8$^a$ of the tubular member 8. This would cause no end of delay and inconvenience.

Although, as pointed out, the cam will maintain the position shown in Figure 2 by reason of the engagement of the end of rod 14 with the flat surface 17$^a$ at dead center, we prefer to provide a lock member 22 which may be of any conventional form including a bolt 23 designed to engage the flat end 24 of the cam which is diametrically opposite the flat surface 17$^a$ previously referred to. When the bolt 23 is engaged with the surface 24, rotation of the cam 17 is positively prevented. The lock is secured in any desired fashion between the sections 2 and 3, and it is to be noted that the lock casing is completely protected by the sections of the housing and cannot be punched out or otherwise tampered with. A suitable key for manipulating the lock may be inserted thereinto through the key hole 25 in the section 2.

By virtue of the radially adjustable connection of saddle 11 with the cam actuated stem or rod 14, the carrier may be readily adapted for rims of all standard sizes. This is a very important item and necessitates the use of but one size of rack. This is quite an item from the manufacturer's view point.

From the foregoing description, read in connection with the accompanying drawing, the manifold advantages, conveniences and economies of our tire carrier will be readily understood and appreciated by those skilled in the art.

Having thus described the invention, what we claim as new and desire to secure by Letters Patent is:

1. A tire carrier comprising a pair of duplicate dish-like members defining a two part housing with a chambered interior, each of said members having a marginal securing flange, the flanges being designed to flatly engage each with the other and being provided with registering depressions defining arm receiving sockets; tubular rim supporting arms fixedly carried in said sockets, rim engaging saddles fixedly carried by certain of said arms and having openings therein whereby a valve stem may be inserted therethrough and into said arms, one of said arms having its inner end projected into said housing, a spring actuated rod slidingly working in said last named arm, a rim engaging saddle having an extensible connection with said rod, a cam journalled within said housing and having an active surface against which the end of said spring actuated rod is caused to bear, the active surface of said cam being flattened at its highest point, a shoulder formed adjacent said flattened cam surface portion and engaging the projecting end of said arm to limit movement of said cam so that the end of said rod will engage said flattened cam portion to hold the rod projected and the cam at rest, a second shoulder at the other end of said active cam surface and designed to engage said rod to prevent the cam from being rotated to disengage the rod from said active surface, a lock within said housing, and a bolt carried thereby and designed to engage said cam to lock the same in a set position.

A tire carrier comprising a pair of duplicate dish-like members defining a two part housing with a chambered interior, each of said members having a marginal securing flange, the flanges being designed to flatly engage each with the other and being provided with registering depressions defining arm receiving sockets; tubular rim supporting arms fixedly carried in said sockets, rim engaging saddles fixedly carried by certain of said arms and having openings therein whereby a valve stem may be inserted therethrough and into said arms, one of said arms having its inner end projected into said housing, a spring actuated rod slidably working in said last named arm, a rim engaging saddle having an extensible connection with said rod, a cam journalled within said housing and having an active surface against which the end of said spring actuated rod is caused to bear, the active surface of said cam being flattened at its highest point, and a shoulder formed adjacent said flattened cam surface portion and engaging the projecting end of said arm to limit movement of said cam so that the end of said rod will engage said flattened cam portion to hold the rod projected and the cam at rest.

3. A tire carrier comprising a housing having a plurality of radially extending arms and rim supporting portions associated therewith, the rim supporting portion of one of said arms being extensibly connected thereto and extending into said housing, a cam member within said housing, yielding means for normally maintaining engagement between said cam and the end of said extensible rim supporting portion, said cam having its highest point substantially flat to support the end of said aforementioned portion in extended rim supporting position, said cam having a shoulder at one end of said flattened portion, and means engaging said shoulder for limiting rotation of said cam to prevent movement thereof beyond the point where the rim supporting portion is fully extended.

4. A tire carrier comprising a housing, radially projecting rim supporting members carried thereby, one of said arms being tubular, a rim engaging member having a shank slidable within said tubular arm and having its end projecting into said housing, a cam journalled in said housing, yielding means for causing the end of said shank to bear against said cam, the high point of said cam being so shaped that when said shank end is in engagement therewith the cam will be held stationary, and said tubular member projecting into said housing and designed to engage a portion of said cam whereby to limit movement thereof in one direction when said shank end is in engagement with the high point thereof.

5. A tire carrier comprising a housing having rim supporting portions associated therewith, a radially movable rim engaging element associated with said housing having an operating portion extending thereinto, a cam within said housing, operating means therefor, yielding means for normally forcing the operating portion of said rim engaging element to bear against said cam, spaced abutments associated with said cam one of said abutments being engageable with said rim engaging element to limit movement of said cam in one direction to prevent disengagement of said element therefrom and means engaging the other abutment to limit movement of the cam in the other direction whereby the operating portion of the rim engaging element will be held in constant engagement with the cam.

6. A tire carrier comprising a housing having rim supporting portions associated therewith, a radially movable rim engaging element associated with said housing and having an operating portion extending thereinto, guide means for said rim engaging element said guide means having one end extending into said housing, a cam within said housing, operating means therefor, yielding means for normally causing the operating portion of said rim engaging element to bear against said cam, spaced abutments associated with said cam, one of said abutments being engageable with said rim engaging element to limit movement of said cam and to prevent disengagement of said element therefrom, and the highest point of said cam being formed so that the cam is restrained from moving by engagement of said rim engaging element therewith, and the end of said guide member being disposed in the path of the other said abutments whereby to retain said cam against movement in one direction when said aforementioned cam portion is in engagement with said rim engaging element.

7. In a tire carrier, a housing comprising spaced plates having opposed portions defining sockets, means for clamping said plates together, arms carried in said sockets and one of said arms having a circumferential groove defining shoulders to be engaged by the ends of its socket whereby the said arm will be held fixedly in position.

In testimony whereof we affix our signatures.

FRANK M. PFEIFER.
EDWARD VAN CAMP.